Figure 1:
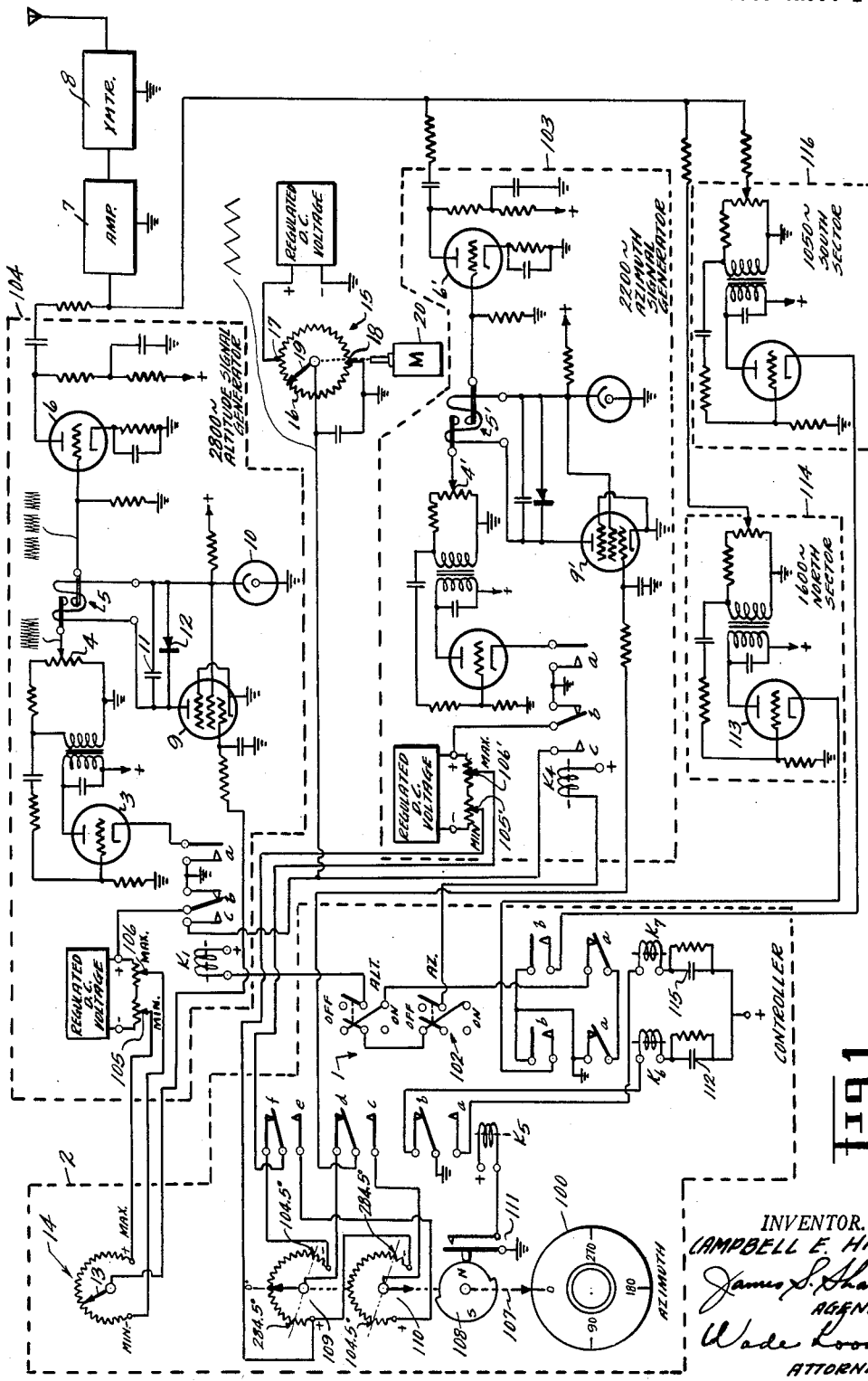

April 24, 1962     C. E. HILLS     3,031,603

PULSE SIGNAL PROPORTIONAL CONTROL SERVOSYSTEM

Filed Jan. 7, 1954     5 Sheets-Sheet 1

INVENTOR.
CAMPBELL E. HILLS
James S. Shannon
AGENT
Wade Loouty and
ATTORNEYS

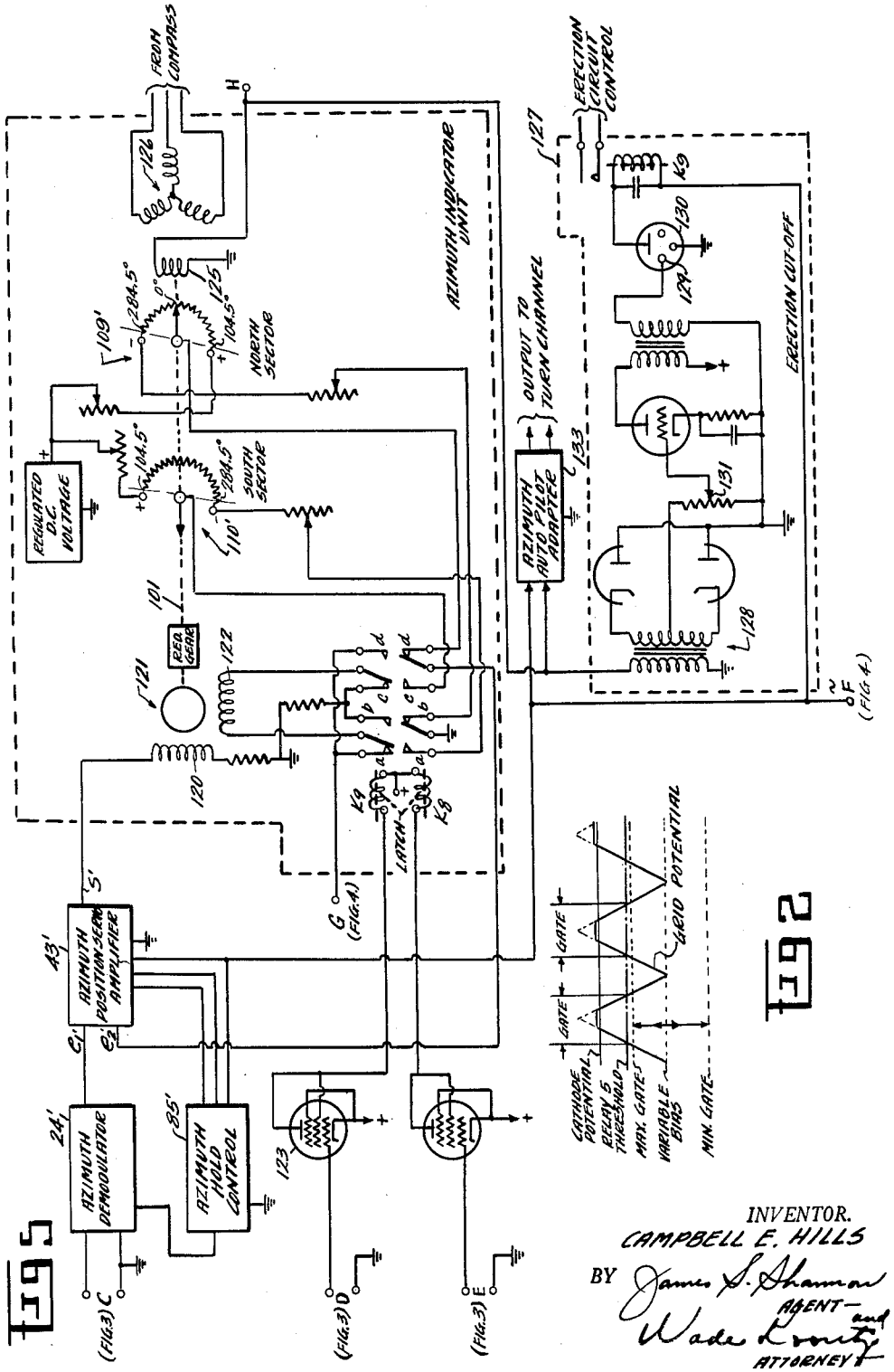

April 24, 1962 C. E. HILLS 3,031,603
PULSE SIGNAL PROPORTIONAL CONTROL SERVOSYSTEM
Filed Jan. 7, 1954 5 Sheets-Sheet 3
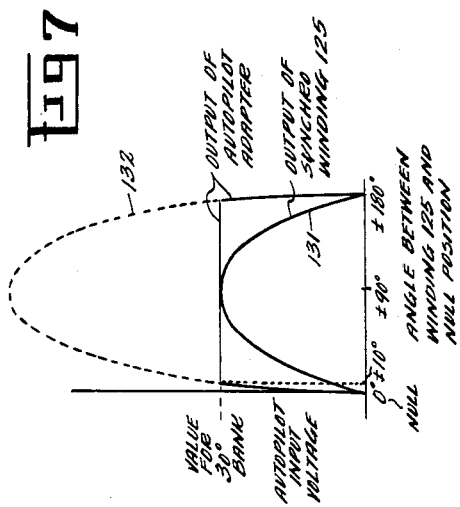
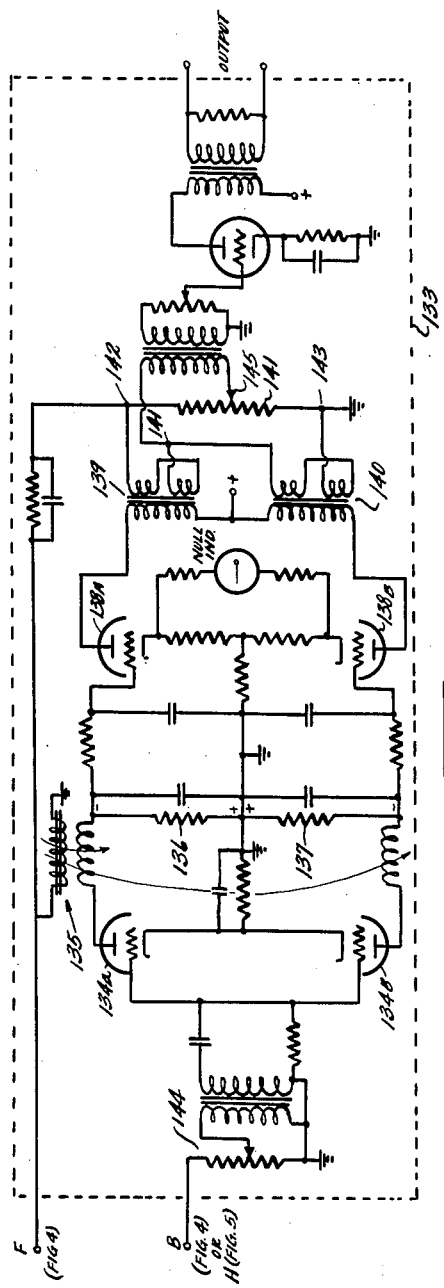
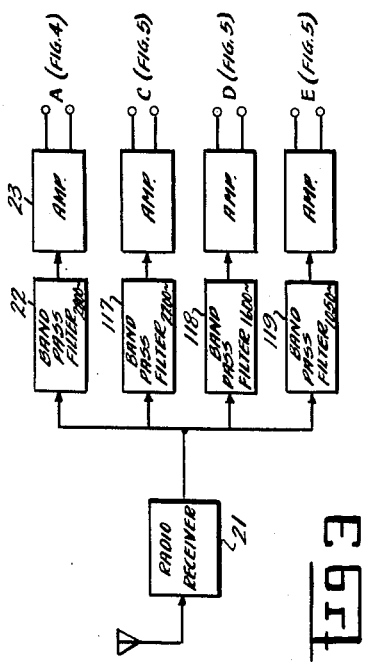
INVENTOR.
CAMPBELL E. HILLS
BY James S. Shannon
AGENT
Wade Loorty
ATTORNEY

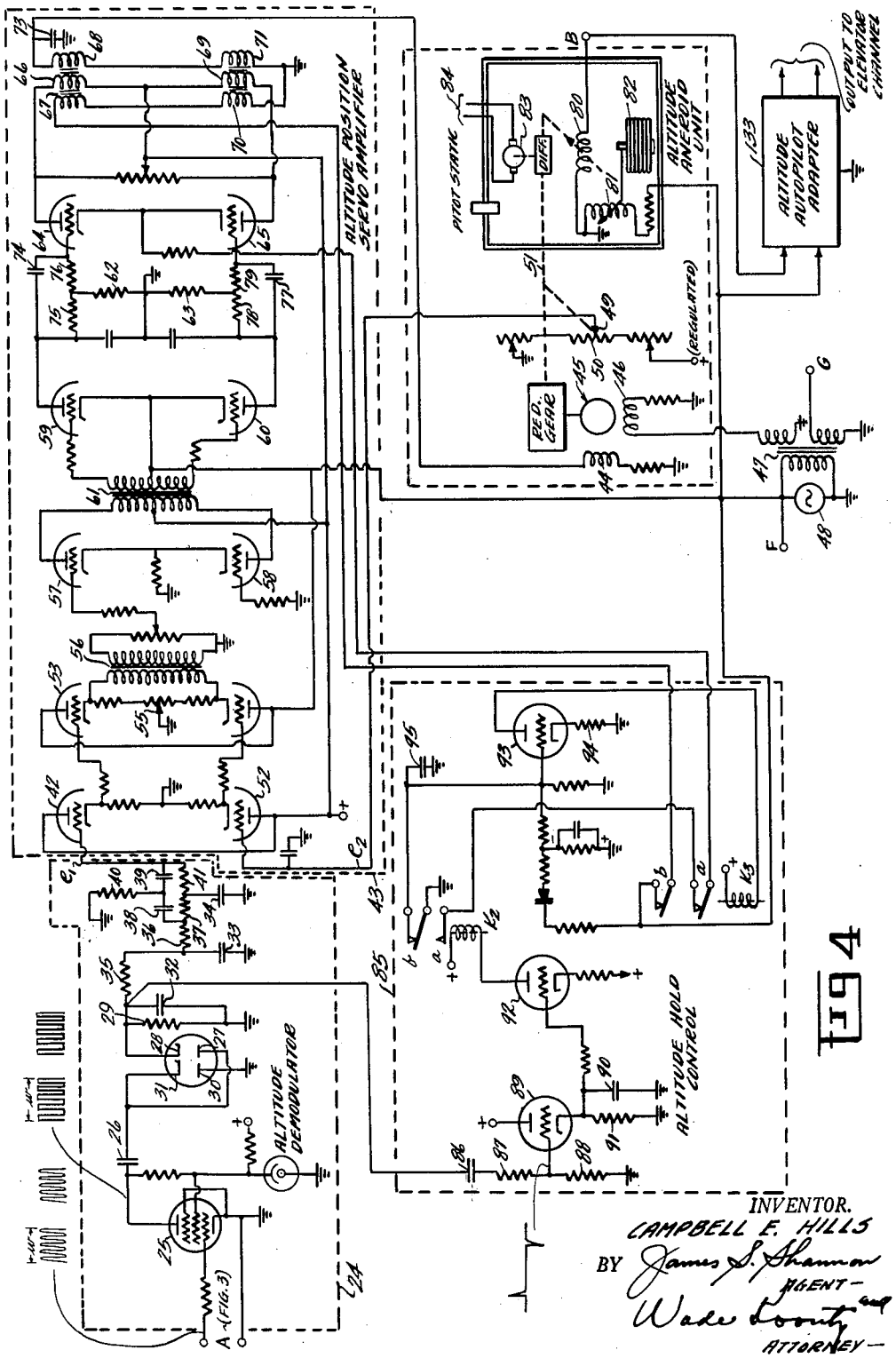

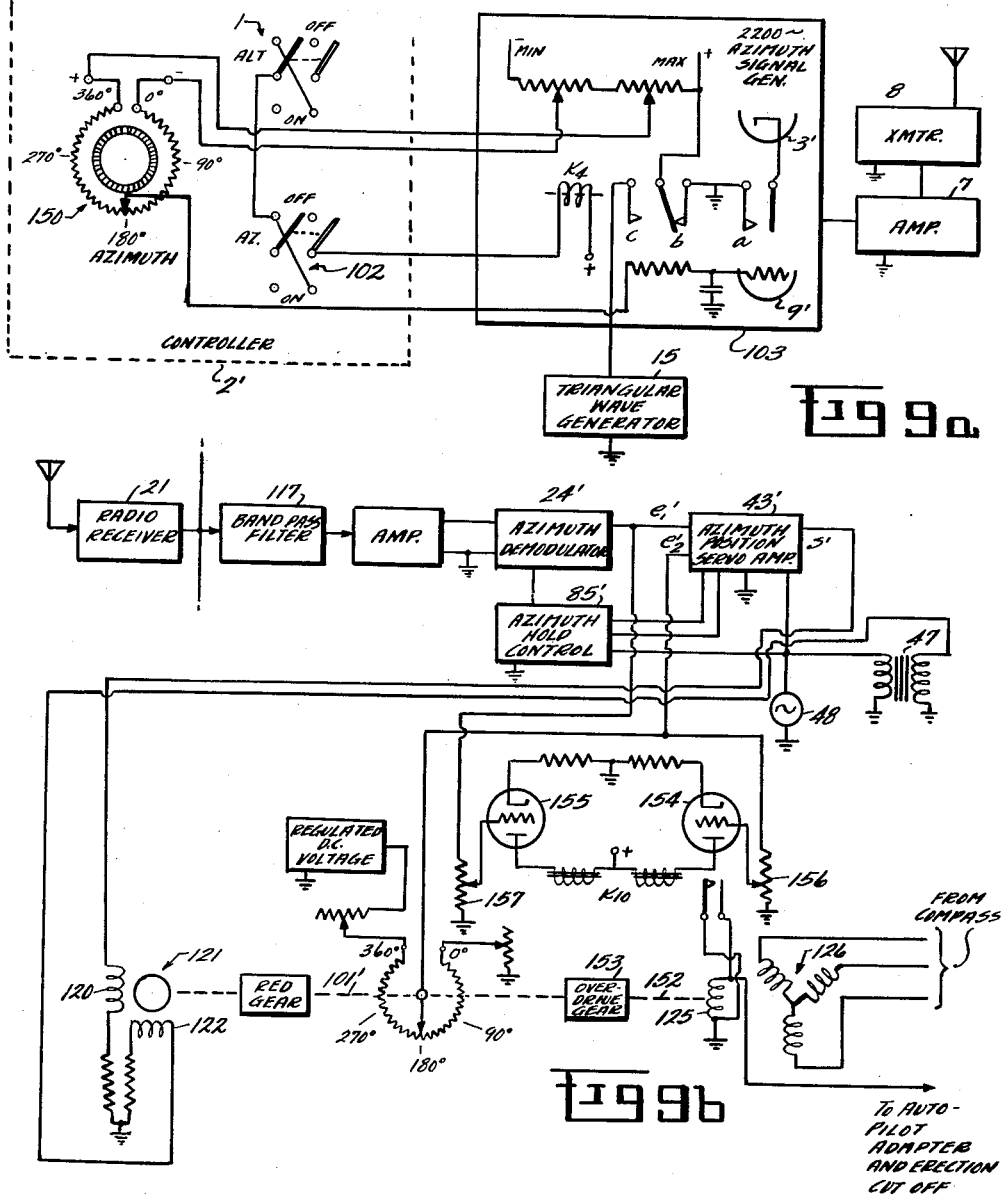
Fig 9a.
Fig 9b.
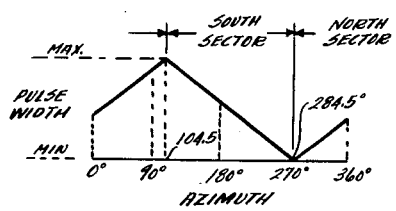
Fig 6
INVENTOR.
CAMPBELL E. HILLS
BY
AGENT —
ATTORNEY —

United States Patent Office 3,031,603
Patented Apr. 24, 1962

3,031,603
PULSE SIGNAL PROPORTIONAL CONTROL SERVOSYSTEM
Campbell E. Hills, Lewiston, N.Y., assignor to the United States of America as represented by the Secretary of the Air Force
Filed Jan. 7, 1954, Ser. No. 402,831
9 Claims. (Cl. 318—16)

This invention relates to remote proportional control systems of the command position type. It is the general object of the invention to provide a proportional control system in which the position of an element can be accurately controlled from a remote point by a unidirectional transmission of energy therebetween. More specific objects of the invention are to provide a command position remote control system in which the control information is contained in the width or duration of pulses of energy transmitted at a constant repetition rate, and to provide such a system in which the possible control functions include the continuous rotation of a shaft through any number of degrees in either direction.

In general, the control station comprises, in each control channel, an oscillator of frequency distinct from the other oscillator frequencies and means for gating the oscillator to produce an alternating current pulse having a duration proportional to the desired position in a control function. These pulses are then transmitted to the controlled station over a suitable energy transmission link, such as radio or a transmission line, where they are separated by filters and the pulses from each channel converted into a voltage proportional to their duration. This voltage is applied to a suitable servo system which brings the controlled object to the position indicated by the voltage amplitude. In providing for continuous shaft rotation in either direction, the shaft rotation is divided into two 180° sectors with the arrangement that, for continuous rotation in one direction, the control pulse increases from its minimum width to its maximum width in one sector and decreases from its maximum width to its minimum width in the other sector, thus avoiding the discontinuity in control pulse width and reversal of the direction of rotation that would otherwise occur upon returning to the 0° position. Where the output shaft is used to position an electrical pick-off, a simpler system is disclosed in which a single pulse is used for 360° of rotation and the pick-off is short circuited during its rapid reverse rotation accompanying the abrupt change of pulse width between its maximum and minimum values.

A more detailed description of the invention will be given in connection with the accompanying drawings which illustrate a proportional control system in accordance with the invention designed for the specific purpose of controlling the altitude and magnetic heading of an aircraft or missile. In the drawings FIG. 1 shows the control station;
FIG. 2 illustrates the operation of the pulse width control circuit;
FIGS. 3, 4 and 5 show the controlled station;
FIG. 6 illustrates the control pulse width variation in the azimuth channel;
FIG. 7 illustrates the operation of the autopilot adapter;
FIG. 8 is a schematic diagram of the autopilot adapter; and
FIGS. 9a and 9b show an alternative azimuth control system.

In the altitude-azimuth control station shown in FIG. 1, the operation of the altitude control channel will be considered first. With altitude switch 1 in controller 2 in the "On" position, relay K1 is energized closing contacts K1a and K1c. Closure of contacts K1a grounds the cathode of tube 3 and initiates oscillation of the 2800 c.p.s. oscillator circuit of which this tube forms a part. The oscillator output, the amplitude of which may be adjusted by potentiometer 4, is applied to one terminal of gate relay 5 the other terminal of which is coupled to the grid of isolating amplifier 6. Therefore, whenever relay 5 is closed audio energy is applied to amplifier 7 and thence to transmitter 8 where it modulates the radiated carrier frequency.

The operation of gate relay 5 is controlled by gate tube 9 which obtains constant operating voltages from gaseous voltage regulator tube 10. Condenser 11 and rectifier 12 limit the negative peaks and back wave appearing across the relay coil. The voltage on the grid of tube 9 is the sum of the voltage at contact 13 of altitude control potentiometer 14, the minimum and maximum values of which may be adjusted by contacts 105 and 106, and the instantaneous value of the triangular wave applied through contacts K1c from triangular wave generator 15. This generator comprises a continuous circular resistance element 16 having a constant direct voltage applied across taps 17 and 18 which are exactly 180° apart. The output is taken from contact 19 which is rotated at a constant speed of 10 r.p.m. by motor 20.

The altitude control potentiometer 14 may be calibrated over an altitude range between predetermined minimum and maximum values. Contact 13, which may be set to any desired altitude within this range, adjusts the bias on the grid of tube 9 and thereby determines the portion of each triangular wave cycle during which the relay 5 is closed. This action is illustrated in FIG. 2. As the bias is made less negative the grid potential exceeds the threshold value of the relay for an increasingly greater part of the triangular wave cycle and the gate length is increased correspondingly. The output of tube 6 therefore consists of a series of alternating current pulses having a repetition rate of 10 per second and a length or duration proportional to the requested altitude.

The altitude signal from transmitter 8 is received and demodulated by receiver 21, FIG. 3, located at the controlled station. The resulting alternating current pulses, identical to those in the output of tube 6, are applied through filter 22 to amplifier 23 and occur in amplified form at terminals A. The altitude channel of the controlled station is shown in FIG. 4. The signal from amplifier 23, FIG. 3, is applied through terminals A to altitude demodulator 24. The purpose of the demodulator is to convert the applied series of alternating current pulses into a direct voltage the amplitude of which is proportional to the number of audio cycles contained in each pulse. This is accomplished by first limiting the applied pulses to a constant amplitude in tube 25, the positive half-cycles being limited by grid conduction and the negative half-cycles by anode current cut-off. Each of the major pulses in the output of tube 25 therefore consists of a series of shorter pulses at the 2800 c.p.s. rate as shown in FIG. 4. Each of the shorter pulses causes a current to flow through condenser 26, diode 27—28 and resistor 29 during the existence of the pulse. The resulting increment in the charge on condenser 26 is removed during the intervals between the shorter pulses by diode 30—31. Since a fixed amount of current flows through resistor 29 each time one of the shorter pulses is applied, the average current through this resistor over a period of time long in comparison to the major pulse repetition period of $\frac{1}{10}$ second is proportional to the number of shorter pulses occurring in each major pulse or, in other words, to its width $w$. Elements 32 through 37 constitute a low pass filter to reject the high frequency components of the square wave of voltage across resistor 29, elements 37 and 34 also being part of a twin T filter, including also elements 38, 39, 40 and 41, designed to reject the 10-cycle repetition rate of the square wave. The output of this filter, which is a direct voltage $e_1$ proportional to the width $w$ of the major pulses, is applied to the grid of tube 42 in altitude position servo amplifier 43.

Servo amplifier 43 supplies alternating current energy to variable phase winding 44 of two-phase servomotor 45, the fixed phase winding 46 of which is energized through transformer 47 from source 48. The rotor of servomotor 45 drives contact 49 of linear follow-up potentiometer 50 through a suitable mechanical coupling 51 such as a shaft. The potential $e_2$ at contact 49 is applied to the grid of tube 52 in the servo amplifier for comparison with the command signal on the grid of tube 42. Operation of the servo amplifier may be explained by first considering the potentials $e_1$ and $e_2$ on the grids of these tubes to be equal. With these two potentials equal the outputs of tubes 42 and 52, which are connected as cathode followers, are equal and the potentials on the grids of tubes 53 and 54 are also equal. Alternating potential from source 48 is applied to the anodes of tubes 53 and 54 in parallel. Since the grid potentials of these tubes are equal, the anode currents of these tubes are equal or substantially so, and the potentials of their cathodes relative to ground are equal or can be made so by adjustment of contact 55. With equal cathode potentials the voltage across the primary of transformer 56 is zero and consequently there is no signal on the grid of tube 57 and no output from phase inverter stage 57—58.

The grids of tubes 59 and 60 receive equal and oppositely phased signals from transformer 61. Alternating potential from source 48 is applied in equal amplitude and phase between the anodes and cathodes of these tubes. With zero signal from transformer 61 the currents through resistors 62 and 63 are equal and equal negative potentials are applied to the grids of tubes 64 and 65. The coupling networks between tubes 59—60 and tubes 64—65 are identical T-type networks, one network consisting of elements 74—75—76—62 and the other consisting of elements 77—78—79—63. These networks are designed to give a phase advance of approximately 55° at 4 c.p.s. and serve to stabilize the servo system, allowing more gain without hunting or overshoot. A transformer is connected to the output circuits of tubes 64 and 65 which has a winding 66 controlling the saturation of the magnetic path between primary winding 67 and secondary winding 68, and a winding 69 controlling the saturation of the magnetic path between primary winding 70 and secondary winding 71. Primary windings 67 and 70 are equally energized from source 48 while secondary windings 68 and 71 are connected in series with opposed phases so that when the couplings between the primaries and secondaries are equal the output of the servo amplifier is zero. These couplings are equal, or can be made so by adjustment of tap 72, when the potentials on the grids of tubes 59 and 60 are equal. Therefore, when the follow-up potential $e_2$ from contact 49 applied to the grid of tube 52 equals the command signal $e_1$ on the grid of tube 42, variable phase winding 44 is deenergized and the servomotor does not run.

A difference in the potentials on the grids of tubes 42 and 52 produces an energization of winding 44 in proportion to the difference and having one of two inverse phases depending upon which of the two grid potentials is the greater. The direction of the resulting rotation of the servomotor is such as to bring the voltage on the grid of tube 52 into equality with that on the grid of tube 42. Assuming, for example, that the voltage on the grid of tube 42 exceeds that on the grid of tube 52, an output will appear at the secondary of transformer 56 having a magnitude proportional to the difference and having a phase either equal to that of source 48 or opposite thereto depending upon the transformer connections. This output is converted into a balanced output signal by phase inverter stage 57—58 so that the signals on the grids of tubes 59 and 60 are of opposite phase and equal amplitude. Since in-phase alternating potentials exist between the anodes and cathodes of these tubes it follows that the grid and anode phases will be the same in one tube and the opposite in the other. Anode conduction in the tube receiving the in-phase voltages increases whereas that in the tube receiving the oppositely phased voltages decreases with the result that conduction in one of tubes 64 and 65 increases while that in the other tube decreases. This causes an increased saturation and reduced transfer of energy in the case of one set of primary and secondary windings of the output transformer and decreased saturation and increased energy coupling in the case of the other set. Consequently a differential output is produced from the series connected secondaries 68 and 71, the phase of which is the same as that of the predominant secondary voltage. This output is applied to winding 44 of the servomotor, the arrangement being such that the resulting rotation of the motor moves the tap 49 in a more positive direction until the voltage on the grid of tube 52 is equal to that on the grid of tube 42. Condenser 73 serves with the inductances in the circuit to establish a 90° phase difference between the current in winding 44 and that in winding 46. The operation of the circuit when the command signal is less than the voltage on the grid of tube 52 is the same as that described above except that the phase conditions are reversed and the servomotor rotates in the opposite direction to move contact 49 in a negative direction until equality of the two voltages is achieved.

The final result of the above control system is to position shaft 51 at a point in its range of angular movement corresponding to the position of contact 13 of altitude control potentiometer 14 (FIG. 1) within its range of movement. The altitude of the aircraft is controlled by shaft 51 in the following manner: Shaft 51 is coupled to secondary winding 80 of an altitude pick-off transformer the primary winding 81 of which is energized from source 48 and positioned by aneroid unit 82. Altitude control potentiometer 14 operates through the above described remote control system and shaft 51 to position winding 80 at a point corresponding to the requested altitude. If the aircraft is not at the requested altitude a voltage is induced in winding 80 which is either in-phase or of opposite phase with respect to source 48 depending upon whether the actual altitude is greater or less than the requested altitude. This signal, appearing at terminal B, is applied to the altitude control circuit of the aircraft and causes it to ascend or descend, as the case might be, seeking the requested altitude. As the altitude changes winding 81 is moved relative to winding 80 by aneroid element 82 in such direction as to reduce the coupling between the two windings. When the aircraft has attained the requested altitude this coupling is zero so that the signal at terminal B is likewise zero and the aircraft resumes level flight. Any tendency for the aircraft to deviate from the requested altitude results in a counteracting signal at this terminal. If potentiometer 14 of FIG. 1 is moved to a new position winding 80 is moved to a corresponding new position and the aircraft seeks the corresponding new altitude by the process described above. A small motor 83 controlled by circuit 84 may be differentially geared to winding 80 for adjusting its position relative to that of potentiometer contact 49 to permit adjustment for changes in barometric pressure.

The altitude hold control 85 in FIG. 4 keeps the altitude servo positioned during periods when the transmitted signal is off or temporarily lost due to fading or when the channel is turned off. The hold control is necessary since the instant the received signal ceases the servo amplifier input voltage on the grid of tube 42 begins to fall. Any change in input signal calls for a new servo position and instantly the servomotor will run to seek the new position. The faster the motor, the quicker it must be stopped by the hold circuit. The operation of the hold circuit is as follows:

The rectangular altitude control pulse on the cathode 28 in the demodulator 24 is differentiated by circuit 86—87—88 to give a leading edge pulse which acts through cathode follower 89 to charge condenser 90. This condenser charges rapidly due to the low impedance of tube 89 but discharges at a slower rate through resistor 91. The positive potential across condenser 90 is applied to the grid of tube 92 and, when an altitude control signal is being received, is sufficient to overcome the bias on this tube due to the return of its cathode to a source of positive potential. During normal operation, therefore, relay K2 is energized so that contacts K2a are closed and K2b are open. A negative bias derived from the rectification of alternating voltage from source 48 is applied to the grid of tube 93 and, together with the self bias developed across resistor 94, is sufficient to keep relay K3 deenergized when contacts K2b are open. With relay K3 deenergized, the cathodes of tubes 64 and 65 are connected to ground through contacts K3a and K2a, and voltage from source 48 is applied to primaries 67 and 70 through contacts K3b.

Following each leading edge pulse applied to tube 89 condenser 90 discharges almost to the point of release of relay K2. Therefore if the next leading edge pulse is absent the discharge will continue and relay K2 will be deenergized. The opening of contacts K2a disconnects the cathodes of tubes 64 and 65 from ground, and the closing of contacts K2b grounds the grid of tube 93. The latter action raises the potential of the grid of this tube and causes sufficient conduction to energize relay K3. The opening of contacts K3b removes the A.C. energization from primaries 67 and 70 and stops servomotor 45.

Upon return of the altitude control signal relay K2 is reenergized by the first leading edge pulse. This opens contacts K2b which allows the grid of 93 to become more negative at a rate determined by the size of condenser 95. The required rate is determined by the time constant of the filter in the output circuit of demodulator 24 and is made such that the servo amplifier input signal on the grid of tube 42 reaches a steady condition before deenergization of relay K3. With the deenergization of this relay the cathodes of tubes 64 and 65 are again connected to ground through contacts K3a and K2a and the primaries 67 and 70 are again energized from source 48 through contacts K3b for normal operation of the servo system.

The principal difference between the altitude control channel and the azimuth control channel is that the latter is designed to permit a continuous cycling of the control function in either direction. The altitude control function could be varied only back and forth between minimum and maximum limits. The structural differences of the azimuth channel as compared with the altitude channel are to be found in the controller of FIG. 1 and the azimuth indicator unit of FIG. 5. With reference to these figures, azimuth control dial 100 may be rotated continuously in either direction and be followed by shaft 101 of FIG. 5. The manner in which this is accomplished will be explained in the following detailed description of the azimuth control channel:

The azimuth channel is placed in operation by placing switch 102 in controller 2 in the "On" position which will ground relay K4 provided the altitude switch 1 is in the "Off" position. The two channels are interlocked by this arrangement of switches to permit operation of only one channel at a time with precedence given to the altitude channel. Energization of relay K4 places in operation the azimuth signal generator circuit 103 which is identical in all respects save the frequency to altitude signal generator circuit 104, the operation of which has already been explained. The output of this circuit, as in the case of circuit 104, is a series of alternating current pulses the widths or durations of which represent the position of dial 100.

In the azimuth control system the 360° of azimuth are divided into a North sector extending, in a clockwise direction, from 284.5° to 104.5° and a South sector extending from 104.5° to 284.5°. The width of the altitude control pulse produced by circuit 103 is made to vary, considering clockwise rotation, from a minimum value at 284.5° to a maximum value at 104.5° and back to a minimum value at 284.5° as illustrated in FIG. 6.

The mechanism for accomplishing the above is shown in FIG. 1. Dial 100 drives shaft 107 on which are mounted cam 108 and the continuously rotatable arms of potentiometers 109 and 110. The resistance elements of the potentiometers have the same regular positions while the arms on shaft 107 are separated by 180°. Cam 108 is positioned relative to dial 100 so that switch 111 is closed in the South sector, or from 104.5° to 284.5°, and open in the North sector, or from 284.5° to 104.5°, considering clockwise rotation. Further, the arms of potentiometers 109 and 110 are positioned on shaft 107 so that the arm of potentiometer 109 contacts its resistance element throughout the North sector and the arm of potentiometer 110 contacts its resistance element throughout the South sector.

Potentiometers 109 and 110 control the width of the azimuth control pulse generated in circuit 103 by controlling the bias on gate tube 9' in the same manner as pulse width control was obtained in circuit 104 of the altitude channel, already explained. Cam actuated switch 111 and relay K5 operate to energize and connect potentiometer 109 to the bias control circuit when the desired azimuth angle is in the North sector and to energize and connect potentiometer 110 when the angle is in the South sector. Accordingly, as will be seen in FIG. 1, relay K5 is deenergized in the North sector so that potentiometer 109 is energized through contacts K5f and its contact arm is connected to the grid of tube 9' through contacts K5d. In the South sector, relay K5 is energized and operative connections are made to potentiometer 110 through contacts K5e and K5c. Energization for the potentiometers is obtained from contacts 105' and 106' which are provided for adjusting the maximum and minimum voltages applied to the potentiometers, so as to control the maximum and minimum widths of the generated azimuth control pulses.

As shown in FIG. 6 the pulse width of the transmitted azimuth control signal is a direct function of the azimuth angle in the North sector and an inverse function thereof in the South sector. It is therefore necessary for the controlled station to know when transitions between North and South sectors occur in order to be able to adjust its control characteristic accordingly. The indication of these transitions is the function of relays K6 and K7. When a transition is made from the South to the North sector switch 111 opens and condenser 112 charges through the winding of relay K6 and contacts K5b. For the short period during which the charging current exceeds the threshold current of the relay contacts K6b are closed and contacts K6a are open. If either the azimuth or the altitude channel is operative at the time, the opening of contacts K6a disables it by breaking the energizing circuit of relay K4 or K1, since it is desirable that sector switching be given precedence over other control functions. Closure of contacts K6b grounds the cathode of tube 113 in 1600 c.p.s. North sector oscillator 114, causing the generation of a 1600 c.p.s. pulse of short duration which is applied to the transmitter and which serves as the signal indicating the South-to-North sector transition. For the North-to-South transition, switch 111 closes actuating K6 and allowing condenser 115 to charge through the K7 winding and contacts K5a. The resulting momentary operation of K7 disables the altitude or azimuth channel through the action of contacts K7a and renders 1050 c.p.s. South sector oscillator 116 operative through the closure of contacts K7b. The resulting short 1050 c.p.s. pulse is applied to the transmitter and constitutes the signal indicating the North-to-South transition.

At the controlled station the azimuth signals are channelled into their appropriate circuits by filters 117, 118 and 119, FIG. 3. The signals appearing at terminals C, D and E are identical to those at the outputs of generator 103 and oscillators 114 and 116, respectively, in FIG. 1. The azimuth channel of the controlled station is shown in FIG. 5. Its essential function is to rotate shaft 101 in step with dial 100 of FIG. 1 through any number of revolutions of the dial in either direction. This is accomplished in the following manner:

The signal at terminals C, which is a series of alternating current pulses the widths of which indicate the position of dial 100, is applied to demodulator 24'. This demodulator is identical to the previously explained demodulator 24 of the altitude channel and operates to convert the applied pulses into a direct voltage $e'_1$ the amplitude of which is indicative of the position of dial 100 or in other words the requested azimuth. This voltage and a follow-up voltage $e'_2$ are applied to azimuth position servo amplifier 43' which is identical to previously explained amplifier 43 in the altitude channel. An alternating voltage $s_1$ is produced by the servo amplifier that is proportional to the difference between $e'_1$ and $e'_2$, being zero when these two voltages are equal. The voltage $s_1$ is derived from source 48 (FIG. 4) and has a phase either leading or lagging that of this source by 90° depending upon which of the two voltages $e'_1$ and $e'_2$ is the greater. The output of the servo amplifier is applied to variable phase winding 120 of two-phase servomotor 121. Winding 122 of the servomotor is also energized from source 48 (FIG. 4), the phase being the same as or opposite to that of the source depending upon the sector, as will be seen later.

Servomotor 121 drives shaft 101 which carries, with 180° spacing, the contact arms of North sector potentiometer 109' and South sector potentiometer 110'. These are continuously rotatable potentiometers similar to corresponding potentiometers 109 and 110 in the controller of FIG. 1. Relays K8 and K9 respond to the North sector and South sector signals at terminals D and E to connect the proper potentiometer into the circuit and to supply the proper phase to winding 122. When the control dial 100 of FIG. 1 passes from the South to the North sector a short 1600 c.p.s. pulse appears at terminal D. Tube 123 is normally biased sufficiently to reduce the anode current below the threshold of relay K9. The signal at terminal D therefore increases the anode current and energizes K9. A latching mechanism is provided between K8 and K9 so that when either is momentarily energized it is latched in its operated position and the other relay is released from its operated position. Therefore the effect of the signal at D is to close contacts K9a, K9c, K8b and K8d. As a result North sector potentiometer 109' is energized through contacts K8b and its contact arm is connected to the servo amplifier through contacts K8d. Further, the phase of the voltage applied to winding 122 through contacts K9a and K9c is such that shaft 101 will be driven clockwise when $e'_2$ is less than $e'_1$ and counterclockwise when greater than $e'_1$.

When control dial 100 passes from the North to the South sector a short 1050 c.p.s. pulse appears at terminals E and the grid of tube 124. This pulse actuates relay K8 and releases relay K9. As a result, South sector potentiometer 110' is energized and its contact arm connected to the servo amplifier through now closed contacts K8a and K8c, respectively. Also, closure of contacts K9b and K9d reverses the phase of the voltage applied to winding 122 so that shaft 101 is now driven clockwise when $e'_2$ is greater than $e'_1$ and counterclockwise when $e'_2$ is less than $e'_1$. Continuous rotation of shaft 101 in either direction in response to similar rotation of dial 100 is therefore possible.

The heading of the aircraft is controlled by the voltage induced in winding 125, the rotor winding of a synchro, as a result of its coupling to the stator windings 126. The stator windings are energized with alternating current from a magnetic compass, the current being derived ultimately from source 48, so that the flux produced by the windings serves as a magnetic North reference. Winding 125 is driven by shaft 101 and its angular position thereon is such that with shaft 101 in the 0° azimuth position, i.e. with azimuth control dial 100 at 0°, and the aircraft heading to magnetic North, zero voltage is induced in winding 125. If the aircraft deviates from this heading a voltage is induced in winding 125 which has the same or the opposite phase with respect to the phase of source 48 depending upon the direction of deviation. This signal, when applied to the turn control circuit of the aircraft, opposes the deviation and maintains the heading at magnetic North. Any new heading of the aircraft may be established by setting azimuth control dial 100 in the control station to the desired heading. This will result in shaft 101 and winding 125 assuming a position corresponding to the requested heading. The voltage induced in winding 125 will then change the heading of the aircraft in the direction of the requested heading which will cause the flux produced by windings 126 to rotate with respect to these windings and the winding 125. When the requested heading has been reached the flux will be in such direction with respect to winding 125 as to induce zero voltage therein and the aircraft will be automatically held at this heading by the process described above until a new heading is requested.

Azimuth hold circuit 85' is similar in all respects to the altitude hold circuit 85 of FIG. 4, the operation of which was explained in connection with the altitude channel so that further discussion is not necessary.

All corrections for azimuth are made by signals introduced into the turn circuit of the autopilot. In normal level flight the roll and pitch axes of the aircraft are kept parallel to the earth's surface by automatic erection of the vertical gyro in the autopilot. If, during turns, this erection system were not disabled false erection would take place causing the plane to leave the turn out of level. The erection cut-off circuit 127 prevents this by disabling the erection system whenever a signal appears at the output of winding 125. This signal is applied to full wave rectifier 128 the output of which is the same for either phase of the input signal. After amplification this wave is applied to control electrode 129 of gaseous tube 130 which has relay K9 in its anode circuit. The anode circuit is energized from source 48 (FIG. 4) and since the alternating voltage on electrode 129 has twice the frequency of that on the anode of tube 30, the grid is driven positive during each half-cycle of the voltage applied to the anode. Tube 30 may therefore be fired by a signal from winding 125 of either phase. Relay K9, when energized, operates a relay in the autopilot disabling the erection system. Potentiometer 131 controls the sensitivity of the cut-off circuit and should be adjusted so that relay K9 operates for all error signals equivalent to 3° or more; this setting, however, may be varied to suit conditions.

The signal from winding 80 of the altitude control channel (FIG. 4) and the similar signal from winding 125 of the azimuth control channel (FIG. 5) are not suitable for direct application to an autopilot. The reason for this may be seen in FIG. 7 as applied to the azimuth channel. Curve 131 represents the output voltage characteristic of the synchro in the azimuth indicator unit of FIG. 5. If this signal were fed directly to the aileron channel of the autopilot a ninety degree rotation of the synchro would be required to achieve 30° bank of the aircraft, and in correcting lesser errors of heading the aircraft would bank correspondingly less. Course corrections therefore would be very insensitive. If the sensitivity were increased so that 10° rotation of the synchro produced the output required for a 30° bank, as illustrated by curve 132, then further rotation of the synchro would increase the voltage to a point beyond the circuit limits of the autopilot. A limiter could be used to limit the output voltage beyond a certain value. However, the output would then contain a high percentage of harmonics and would not be satisfactory for injection into an autopilot. A similar situation exists with respect to the output of winding 80 in the altitude channel of FIG. 4, wherein, if the signal at terminal B were applied directly to the elevator channel of the autopilot, a 90° rotation of winding 80 would be required to attain full elevator.

Autopilot adapters 133 in the output circuits of the altitude and azimuth channels modify the above signals to provide suitable signals for the autopilot. The schematic diagram of this device is shown in FIG. 8. Referring to this figure, tubes 134A and 134B serve as an amplifier, discriminator and limiter. The signal from winding 80 or 125 is applied to the grids of these tubes in parallel. The anode circuits are energized with oppositely phased alternating current from source 48 by way of transformer 135. Since the signal on the grids has either the same or the opposite phase relative to source 48 its phase relative to the anode phase in each of tubes 134A and B will be the same or opposite depending upon the phase of the input error signal. In the absence of a signal, the anode currents in tubes 134A and 134B are the same and the negative direct potentials developed across resistors 136 and 137 are the same. These potentials are applied through low-pass filters to the grids of tubes 138A and 138B. The anode currents of these tubes flow through saturation control windings of saturable reactors 139 and 140 which form two adjacent arms of an alternating current bridge, the other two arms of which are formed by the two halves of resistor 141. The bridge is energized from source 48 across opposite points 142 and 143 and its output is derived from opposite points 144 and 145.

With zero error signal the anode currents of tubes 134A and 134B are equal and, therefore, the anode currents of tubes 138A and 138B are also equal. For this condition there is zero output from the bridge; or the output may be made to equal zero by slight adjustment of tap 145. When an error signal is aplied to the grids of tubes 134A and 134B conduction in the tube in which the anode and grid are in phase is increased and conduction in the tube in which the anode and grid are out of phase is decreased. Consequently the grid of one of tubes 138A and 138B is made less negative and the grid of the other is made more negative. In the former case, as the grid becomes less negative the anode current increases, eventually saturating inductor 139, the tube, or both, so that no further decrease in its reactance takes place. In the latter case, the increasingly negative grid reduces the anode current until eventually cut-off is reached and no further increase in the reactance of inductor 140 takes place. The output of the bridge at this point is a maximum and no further increase in error signal input will affect it. The gain of tubes 138A and 138B is sufficiently high that maximum bridge output may be attained at a comparatively small error signal, the exact value of which may be adusted by potentiometer 144. In the case of the azimuth channel the circuit may be adjusted to produce maximum output at an error signal equivalent to 10° as shown in FIG. 7. The output remains at the maximum value as long as the error signal exceeds the 10° value. For a decreasing error signal, conduction is resumed in one of tubes 138A and 138B and the condition of saturation is relieved in the other at the 10° value. The output of the bridge then decreases to zero with the error signal.

FIGS. 9a and 9b show an alternative azimuth control channel which supplies an electrical output which, for practical purposes, is the same as the electrical output of winding 125 in FIG. 5. This is accomplished without the necessity for a continuous 360° rotation of the controlled shaft which considerably simplifies the control channel as compared with that shown in FIGS. 1 and 5.

FIG. 9a illustrates the azimuth channel portion of the control station. The azimuth portion of the controller 2' requires only a single control potentiometer 150 as compared with the two required in the system of FIG. 1. This potentiometer, which is set in accordance with the desired azimuth and supplies a variable bias to the grid of gate tube 9' in azimuth signal generator 103, may have any desired angular extent but preferably has an extent as near to 360° as practical construction will permit. The signal generator 103, as well as triangular wave generator 15, amplifier 7 and transmitter 8, are identical to the corresponding units of FIG. 1 which have already been explained. When potentiometer 150 is at the 0° position a series of 2200 cycle pulses of minimum duration are generated. As the potentiometer is rotated clockwise the duration of the pulses increases to a maximum value at 360°. The potentiometer is arranged for continuous rotation with the result that crossing the gap between the ends of the resistance element causes the grid of tube 9' to become free, which reduces the anode current sufficiently to open the gate relay of the azimuth signal generator. Therefore crossing the gap in the clockwise direction causes the output of generator 103 to jump from maximum signal width to zero signal to minimum signal width and crossing in the counterclockwise direction causes the output to jump from minimum signal width to zero signal to maximum signal width.

The azimuth channel at the controlled station is shown in FIG. 9b. Receiver 21, filter 117, demodulator 24', servo amplifier 43' and hold control 85' are identical to the corresponding units of FIGS. 3 and 5. The voltage $e'_1$ is proportional to the duration of the received pulses. Follow-up voltage $e'_2$ is indicative of the position of shaft 101'. Voltage $s'$ is an alternating voltage proportional to the difference $e'_1 - e'_2$ and has one of two inverse phases depending upon the sign of this difference. Voltage $s'$ is applied to variable phase winding 120 of servomotor 121, the fixed phase winding 122 of which derives its energization for the same source as that from which $s'$ is derived.

Only a single follow-up potentiometer 151 is required. This potentiometer, driven by shaft 101' is not arranged for continuous rotation but has stops at its 0° and 360° limits. Shaft 152, which carries winding 125, is coupled to shaft 101' through overdrive gear 153. The arrangement is such that rotation of the wiper of potentiometer 151 from its 0° position to its 360° position, which required less than a complete revolution of shaft 101', produces nevertheless a complete revolution of shaft 152 and winding 125.

If potentiometer 150 (FIG. 9a) is set to a desired azimuth, potentiometer 151 is rotated to a position corresponding to the same azimuth by the same process as already described in connection with the altitude and azimuth channels of FIGS. 1 and 5. However, assume azimuth control potentiometer 150 to be set at 355° and that it is desired to change the heading of the aircraft to 5° by rotating the potentiometer clockwise to the 5° position. Potentiometer 151 will follow potentiometer 150 to the 360° position, but as the wiper of potentiometer 151 enters the gap the voltage $e'_1$ will fall to zero and potentiometer 151 will run counterclockwise in an effort to bring $e'_2$ into equality with $e'_1$. This results in counterclockwise rotation to the 0° position where $e'_2$ has its minimum value. The wiper of potentiometer 151 will then follow the wiper of potentiometer 150 clockwise to the 5° position. Considering the inverse of the above example, in which the heading is changed from 5° to 355° by counterclockwise rotation of potentiometer 150, a similar action occurs. Potentiometer 151 follows potentiometer 150 to the 0° position. When the wiper of potentiometer 150 enters the gap $e'_1$ falls from its minimum value to zero. Since potentiometer 151 is stopped from further counterclockwise rotation no action takes place until the wiper of potentiometer 150 has crossed the gap and is at the 360° point. At this point, $e'_1$ jumps to its maximum value and potentiometer 151 races in the clockwise direction to bring $e'_2$ into equality with $e'_1$, bringing it to its 360° point. Potentiometer 151 then follows potentiometer 150 counterclockwise to the 355° point.

From the above it is seen that passage of the wiper of potentiometer 150 between the ends of its resistance element causes the wiper of potentiometer 151 to take the long way around to the opposite end of its resistance element. In order to prevent the voltage induced in synchro winding 125 by this reverse rotation from being applied to the autopilot a differential relay K10 is provided for shorting the terminals of this winding whenever there is a predetermined difference between voltages $e'_1$ and $e'_2$. One winding of the relay is located in the anode circuit of tube 154, which has $e'_2$ applied to its grid, and the other winding is located in the anode circuit of tube 155, which has $e'_1$ applied to its grid. With $e'_1=e'_2$ the currents in the two tubes may be equalized by potentiometers 156 and 157 so that the magnetomotive force of one coil cancels that of the other and the relay contacts are open.

Since the sensitivity of the servosystem is high and its operation almost instantaneous, the maximum difference between $e'_1$ and $e'_2$ during normal operation is very small. The signal amplitudes on the grids of tubes 154 and 155 are adjusted by potentiometers 156 and 157 so that the differences in $e'_1$ and $e'_2$ occurring during normal operation will not actuate the relay. However, when the wiper of control potentiometer 150 passes across the gap between the ends of the resistance element a large difference between $e'_1$ and $e'_2$ occurs and the relay contacts are closed. For example, for clockwise passage, when the potentiometers are at their 360° points $e'_1$ and $e'_2$ are equal and have their maximum values. Assuming the heading of the aircraft to have reached 360°, the output of winding 125 is zero. If the wiper of potentiometer 150 is now moved across the gap $e'_1$ first drops to zero and then rises to its minimum value when the wiper contacts the 0° end of the resistance strip. Since, with the wiper of potentiometer 151 at the 360° point, $e'_2$ has its maximum value a large difference exists between $e'_2$ and $e'_1$ and the contacts of relay K10 close keeping the output of winding 125 at zero. As the wiper of potentiometer 151 rotates counterclockwise $e'_2$ decreases becoming equal to $e'_1$ when the wiper reaches the 0° point. The relay contacts now open but the output of winding 125 remains zero since it is in the same position as when the contacts closed. The electrical output of the winding 125 is therefore the same as it would have been had a continuous rotation in one direction been possible. A similar action occurs for counterclockwise passage through the gap. In this case $e'_1$ goes to its maximum value when the wiper of potentiometer 150 reaches the 360° point and potentiometer 151 rotates clockwise to bring $e'_2$ into equality therewith.

I claim:

1. A proportional control system comprising means for producing a series of pulses of constant repetition rate; means for varying the duration of said pulses between minimum and maximum limits in accordance with the variation of a quantity between minimum and maximum limits so that the ratio of the differences between the pulse duration and its limits equals the ratio of the differences between said quantity and its limits; means for transmitting said pulses to a remote location; means at said remote location for varying a second quantity between minimum and maximum limits; and means responsive to said pulses and acting on said quantity varying means for maintaining the ratio of the differences between said second quantity and its limits equal to the ratio of the differences between said pulse duration and its limits.

2. A proportional control system comprising means for producing a series of pulses of constant repetition rate; a control shaft; means for varying the duration of said pulses between minimum and maximum limits in accordance with the rotation of said shaft between angular position limits so that the ratio of the differences between the pulse duration and its limits equals the ratio of the angular differences between the angular position of said shaft and its limits; means for transmitting said pulses to a remote location; a controlled shaft at said remote location; means for rotating said controlled shaft between angular position limits; and means responsive to said pulses and acting on said controlled shaft rotating means for maintaining the ratio of the angular differences between the angular position of said controlled shaft and its limits equal to the ratio of the differences between said pulse duration and its limits.

3. A proportional control system comprising means for producing a series of pulses of constant repetition rate; a control shaft; means for varying the duration of said pulses between minimum and maximum limits in accordance with the rotation of said shaft between angular position limits so that the ratio of the differences between the pulse duration and its limits equals the ratio of the angular differences between the angular position of said shaft and its limits; means for transmitting said pulses to a remote location; means for converting said pulses into a command voltage, having minimum and maximum amplitude limits, such that the ratio of the differences between said command voltage and its limits equals the ratio of the differences between the duration of said pulses and its limits; a controlled shaft at said remote location; a servomotor for rotating said controlled shaft between angular position limits; means coupled to said shaft for producing a follow-up voltage having the same minimum and maximum limits as said command voltage and, for any angular position of the shaft between the shaft limits, having such value that the ratio of the differences between its value and its limits equals the ratio of the angular differences between the shaft position and its limits; and means responsive to the difference between said command and follow-up voltages and controlling the energization and direction of rotation of said servomotor for bringing said follow-up voltage into equality with said command voltage.

4. Apparatus as claimed in claim 3 in which means are provided for deenergizing said servomotor in the absence of said pulses.

5. A proportional control system comprising means for producing a series of pulses of constant repetition rate; a control shaft rotatable through any number of degrees in either direction; means dividing a complete rotation of said shaft into two 180° sectors; means for linearly varying the duration of said pulses between minimum and maximum values as a result of rotating said shaft through either of said sectors, said variations in the two sectors being inversely related for unidirectional rotation of the shaft through the two sectors; means for generating a first sector transition signal when said shaft passes out of one of said sectors and another sector transition signal when it passes into said one sector; means for transmitting said pulses and said sector transition signals to a remote location; means for converting said pulses into a command voltage having minimum and maximum amplitude limits such that the ratio of the differences between said command voltages and its limits equals the ratio of the differences between the duration of said pulses and its limits; a controlled shaft at said remote location capable of being rotated through any number of degrees in either direction; means coupled to said controlled shaft for dividing the rotation of said shaft into two 180° sectors and for producing a follow-up voltage that varies linearly between minimum and maximum values as a result of rotating said controlled shaft through either of said sectors, the variations in said two sectors being inversely related for unidirectional rotation of the shaft through the two sectors; a servo system mechanically coupled to said controlled shaft and responsive to a difference in said command and follow-up voltages to rotate said shaft in a direction determined by the polarity of said difference voltage and proper for bringing said follow-up voltage into equality with said command voltage, said servo system comprising means acting upon receipt of either of said sector transition signals to invert the relationship between the polarity of said difference voltage and said direction of rotation.

6. Apparatus as claimed in claim 5 in which means are provided for disabling said servo system in the absence of said pulses at said remote location.

7. A proportional control system comprising means for producing a series of pulses of constant repetition rate; a control shaft rotatable in either direction; means actuated by said shaft for varying the duration of said pulses linearly between minimum and maximum limits in less than one revolution of said shaft, said duration changing abruptly from one limit to the other in the remainder of the revolution; means for transmitting said pulses to a remote location; means for converting said pulses into a command voltage, having minimum and maximum amplitude limits, such that the ratio of the differences between said command voltage and its limits equals the ratio of the differences between the duration of said pulses and its limits; a controlled shaft at said remote location rotatable only between limits separated by less than 360°; means actuated by said shaft for generating a follow-up voltage, having the same minimum and maximum amplitude limits as said command voltage, such that the ratio of the differences between said follow-up voltage and its limits equals the ratio of the angular differences between the position of said controlled shaft and its limits; a servo system mechanically coupled to said controlled shaft and responsive to a difference in said command and follow-up voltages to rotate said shaft in a direction determined by the polarity of said difference voltage and proper for bringing said follow-up voltage into equality with said command voltage; means establishing an alternating magnetic field; an output winding rotatable in said field; mechanical coupling means between said controlled shaft and said winding for producing a complete rotation of said winding for each rotation of said controlled shaft between its limits; and means responsive to said difference voltage for reducing the output of said winding to zero whenever the magnitude of said difference voltage exceeds a predetermined value.

8. Apparatus as claimed in claim 7 in which means are provided for disabling said servo system in the absence of said pulses at said remote location.

9. A signal generator for producing a series of alternating current pulses of constant repetition rate, said generator comprising: a constant frequency oscillator; an output circuit; an electron tube having an anode, a cathode, a control grid and an anode circuit connected between its anode and cathode; means for generating a symmetrical triangular wave of voltage; means for generating a bias voltage and for varying said voltage between predetermined limits; means for applying said variable bias voltage and said triangular wave voltage in series between said grid and cathode; and means for forming a connection between said oscillator and said output circuit when the current in said anode circuit is in excess of a predetermined value.

References Cited in the file of this patent

UNITED STATES PATENTS

| | | |
|---|---|---|
| 2,264,510 | Cox | Dec. 2, 1941 |
| 2,393,892 | De Ganahl | Jan. 29, 1946 |